Patented Feb. 17, 1942

2,273,140

UNITED STATES PATENT OFFICE 2,273,140

PRODUCTION OF SYNTHETIC RESINS FOR MOLDING

Archibald Renfrew, Norton-on-Tees, England, assignor to Imperial Chemical Industries Limited, a corporation of Great Britain No Drawing. Application July 6, 1938, Serial No. 217,813. In Great Britain July 6, 1937

2 Claims. (Cl. 260—73)

This invention relates to the production of synthetic resins in a form suitable for use in molding operations and more particularly to such resins as are likely, by virtue of their methods of preparation, to contain small traces of substances the complete absence of which in the molding powder is desirable.

Hitherto synthetic resin molding powders have been prepared by various methods, all of which have suffered to a greater or lesser extent from the disadvantage that the molding powders were in such a form that any impurities present in them were almost impossible to remove by ordinary washing processes. Consequently traces of impurities remained in such molding powders and the appearance and properties of the final molded product were thereby adversely affected.

This invention has as an object to devise a new method of manufacturing molding powders from synthetic resins so that they are obtained in a form which is highly pervious to cleaning liquors. A further object is to provide molding powders in such form. A further object is to devise a method of removing impurities from such resins. Further objects will appear hereinafter. These objects are accomplished by the following invention.

I have found that I can form a powder in such a pervious condition by bringing a solution of the resin into the state of a very fine spray and then bringing about a precipitation of the resin while the solution is still in this finely divided state. Forming such a fine spray is frequently termed "atomising."

As solvents for the resin it is possible to employ many different substances provided that the resin may be readily precipitated therefrom. Thus acids, especially organic acids may very conveniently be used, since they can be rapidly neutralised, whereupon they become substantially non-solvents for all except water-soluble resins. Organic solvents such as acetone may also be employed, in which case precipitation may be brought about by causing said organic solvents to be rapidly diluted with a non-solvent for the resin, the latter also being miscible with said organic solvents, for example, water. If the solvent is readily volatile, precipitation may also be brought about by introducing the atomised spray into a region of suitably elevated temperature.

Any known type of spray producing apparatus may be used for atomising the resin solution, and any suitable gas may be supplied for the production of the spray, for example, air.

The invention is particularly applicable to polyvinyl resins, for example, polyvinyl chloride, polyvinyl acetate, polyvinyl alcohol, polyvinyl ketones, and to resins comprising the polymers of acrylic acid and α-substituted acrylic acids and of their derivatives.

The invention is, however, of more particular utility when applied to resins of the type known as Formvar, since such resins have hitherto been extremely difficult to purify. "Formvar," as used herein, denotes polyvinyl formal resin, i. e., a resin resulting from the condensation of a partially hydrolyzed polyvinl ester with formaldehyde, one of the general class of polyvinyl acetal resins. Preliminary experiment to determine the correct solvent and precipitating agent for any particular resin may sometimes be necessary, but the following table shows the materials which have been found to give the best results with the resins mentioned above:

| Resins | Solvent | Precipitating agent |
|---|---|---|
| Polyvinyl chloride | Acetone | Water. |
| Polyvinyl acetate | do | Do. |
| Polyvinyl alcohol | Water | Acetone. |
| Polyvinyl formal | Acetic acid | Water (with or without a dissolved neutralising agent). |
| Polyvinyl ketones | Acetone | Water. |
| Poly-acrylic acid or poly-methacrylic acid. | Water | Acetone. |
| Poly-acrylates and poly-α-acrylates. | Acetone or acetic acid. | Water or water with or without a dissolved neutralising agent. |

The precipitation of the resin may be brought about by causing the spray to enter a medium which so reacts with the solvent used, or which so affects its properties, as rapidly to render it substantially a non-solvent for the resin, whereupon the latter is precipitated in a form from which impurities may very readily be washed out. Where the solvent employed is an acid, it is convenient to allow the spray to come into contact with ammonia or other base. A convenient method is to allow the atomized resin solution to fall into an aqueous solution of ammonia. If desired the neutralizing agent may be incorporated in the gas employed to produce the atomised spray. Thus ammonia gas or a mixture of ammonia gas and air is very suitable for this purpose. Where the resin is dissolved in organic solvent, the atomised resin solution is allowed to fall into a large bulk of liquid which is a non-solvent for the resin, and which is also miscible with said organic solvent, for example, a solution of resin in acetone is sprayed into water.

After precipitation, the resin is filtered off and may be readily washed free of impurities by any suitable method.

The invention is further illustrated but not limited by the following examples:

Example 1

A 10% solution of polyvinyl formal resin in glacial acetic acid was sprayed by means of air from an atomiser of known type onto the surface of a large bulk of 5% aqueous ammonia contained in a bath. The bath was vigorously stirred during the spraying and the resin was obtained in a finely dispersed form from which impurities were readily removed by washing twice with 1% aqueous ammonia at room temperature and once with water at 40° C. The washed resin was then filtered off and dried in an air oven at 60–65° C. The dried product when used as a molding powder gave moldings of excellent and uniform colour.

Example 2

A 10% solution of polyvinyl formal resin in glacial acetic acid was sprayed by means of ammonia gas through an atomiser of known type onto the surface of a large bulk of 1% aqueous ammonia contained in a bath, the latter being vigorously stirred throughout the spraying. The resin was washed and dried in a similar manner to that described in Example 1 and the dried product gave moldings of similar quality.

This invention is a valuable advance in the art as it discloses a cheap and easy way of obtaining molding powders free from obnoxious impurities. It is particularly valuable in its application to the resins obtained by the condensation of a partially hydrolysed polyvinyl ester with formaldehyde, since these latter resins are particularly sensitive to the presence of small traces of impurities.

As many apparently widely different embodiments of this invention may be made without departing from the spirit and scope thereof, it is to be understood that the invention is not limited to the specific embodiments thereof except as defined in the appended claims.

I claim:

1. Process of preparing a polyvinyl formal resin molding powder which comprises atomizing a solution of said resin in acetic acid and allowing the atomized solution to fall into a bath of aqueous ammonia whereby said acetic acid is neutralized and said resin is precipitated in finely divided form.

2. Process of preparing a polyvinyl formal resin molding powder which comprises atomizing a solution of said resin in acetic acid by means of ammonia gas and allowing the atomized solution to fall into a bath of aqueous ammonia whereby said acetic acid is neutralized and said resin is precipitated in finely divided form.

ARCHIBALD RENFREW.